United States Patent
Wolf et al.

(10) Patent No.: US 8,074,117 B2
(45) Date of Patent: Dec. 6, 2011

(54) INFERENCE OF CONTRACT USING DECLARATIVE PROGRAM DEFINITION

(75) Inventors: Kenneth D. Wolf, Seattle, WA (US); Nicholas Alexander Allen, Redmond, WA (US); Kirill Gavrylyuk, Seattle, WA (US); Edmund Samuel Victor Pinto, Duvall, WA (US); Tao Xie, Bellevue, WA (US); Asad Jawahar, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 99 days.

(21) Appl. No.: 12/567,610

(22) Filed: Sep. 25, 2009

(65) Prior Publication Data

US 2011/0078509 A1    Mar. 31, 2011

(51) Int. Cl.
  G06F 11/00    (2006.01)
(52) U.S. Cl. ......... 714/38.1; 714/47.1; 714/48; 717/117
(58) Field of Classification Search .................. 714/25, 714/27, 33, 38, 39, 47, 48, 49, 38.1, 47.1; 717/117
See application file for complete search history.

(56) References Cited

U.S. PATENT DOCUMENTS

| | | | |
|---|---|---|---|
| 7,058,886 B1 * | 6/2006 | Sulistio et al. ............... 715/235 |
| 2003/0135584 A1 | 7/2003 | Roberts et al. | |
| 2004/0255137 A1 | 12/2004 | Ying | |
| 2004/0267867 A1 | 12/2004 | Christian et al. | |
| 2005/0005158 A1 | 1/2005 | Alaluf | |
| 2005/0021689 A1 | 1/2005 | Marvin et al. | |
| 2005/0273667 A1 * | 12/2005 | Shrivastava et al. ............. 714/38 |
| 2006/0005175 A1 | 1/2006 | Ringseth et al. | |
| 2006/0029054 A1 | 2/2006 | Breh et al. | |
| 2006/0074734 A1 | 4/2006 | Shukla et al. | |
| 2006/0117009 A1 * | 6/2006 | Joe et al. ........................ 707/7 |
| 2007/0130571 A1 | 6/2007 | Ringseth et al. | |
| 2009/0164973 A1 * | 6/2009 | Barnett et al. ................. 717/110 |
| 2009/0327179 A1 * | 12/2009 | Strassner et al. ................ 706/14 |

OTHER PUBLICATIONS

Daniela Florescu et al , XL: An XML Programming Language for Web Services Specification and Composition, May 7-11, 2002; http://2002.org/CDROM/refereed/481/.
Sheila A. McLlraith et al., Mobilizing the Semantic Web With DAML-Enabled Web Services, http://wwww.ksl.stanford.edu/projects/DAML/Webservices.
H. Peter Alesso, Preparing for Semantic Web Services, http://wwww.sitepoint.com/article/semantic-web-services, May 2, 2004.
Boualem Benatallah et al, Declarative Composition and Peer-to-Peer Provisioning of Dynamic Web Services, http://www.cs.txstate.edu/~hn12/papers/ICDE2002.pdf.

* cited by examiner

Primary Examiner — Robert Beausoliel, Jr.
Assistant Examiner — Joseph D Manoskey
(74) Attorney, Agent, or Firm — Workman Nydegger (57) ABSTRACT

A declarative program definition. The definition is analyzed to produce an application contract that describes semantics for sending and receiving application messages during the successful execution of operations by the program. In addition, this analysis may also generate local behaviors associated with the local execution of the program. Alternatively or in addition, the analysis may infer secondary contracts regarding the sending and receiving of application messages, even though the full details of the secondary contracts are not present in the declarative program definition. For instance, the secondary contracts might include error contracts or consistency contracts.

23 Claims, 7 Drawing Sheets

INFERENCE OF CONTRACT USING DECLARATIVE PROGRAM DEFINITION

BACKGROUND

In message-based communication, some applications act as "clients", and some act as a "service". One type of software application is often termed a "service". In a typical client-service model, the client is an application that initiates communication with services (often over a network). A service is an application that waits for clients to communicate with them, and responds to messages received from clients. A single application can serve as both a client and a service. Often, services are incorporated in a "runtime", which provides underlying functionality that can be used by multiple applications that run on that computing system.

In a client-service system, messages are sent between endpoints. Endpoints are places where messages are sent or received (or both), and they define all the information required for the message exchange. A service exposes one or more endpoints, and the client generates an endpoint that is compatible with one of the service's endpoints. An endpoint describes in a standard-based way where messages should be sent, how they should be sent, and what the messages should look like. Multiple clients may communicate with a single endpoint.

Each service has a message exchange contract that describes a particular message exchange in terms of the ordering of messages, the dependencies of messages, whether the message is in-bound or out-bound, the structure of the message, and so forth.

Services can actually be quite complex, and can be constructed declaratively without using imperative code. For example, Web Services Description Language (WSDL) is an eXternsible Markup Language for describing network services as a set of endpoints operating upon document-oriented or procedure-oriented information. The operations and messages are described abstractly, and then bound to a concrete network protocol and message format to define an endpoint. Related concrete endpoints are combined into abstract endpoints (services).

BRIEF SUMMARY

Embodiments described herein related to the use of a declarative program definition. The definition is analyzed to produce an application contract that describes semantics for sending and receiving application messages during the successful execution of operations by the program. In addition, this analysis may also generate local behaviors associated with the local execution of the program. Alternatively or in addition, the analysis may infer secondary contracts regarding the sending and receiving of application messages, even though the full details of the secondary contracts are not directly present in the declarative program definition. For instance, the secondary contracts might include error contracts that describe the semantics for sending and receiving applications during one or more fault conditions. Alternatively or in addition, the secondary contract might be a consistency contract that describes which operations are to be performed under a transaction. Since this inference of secondary contracts is not directly described in the declarative program definition, this eases the difficulty in creating the declarative program definition.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a declarative program definition is analyzed to produce an application contract that describes semantics for sending and receiving application messages during the successful execution of operations by the program. In addition, this analysis may also generate local behaviors associated with the local execution of the program. Alternatively or in addition, the analysis may infer secondary contracts regarding the sending and receiving of application messages, even though the full details of the secondary contracts are not present in the declarative program definition.

First, some introductory discussion regarding computing systems will be described with respect to FIG. 1. Then, various embodiments of mechanism for formulating a service using declarative statements of the service will be described with respect to FIGS. 2 and 3. Finally, a mechanism for implying secondary contracts based on the service definition that defines the primary contract will be described with respect to FIGS. 4 through 9.

Figure 1:
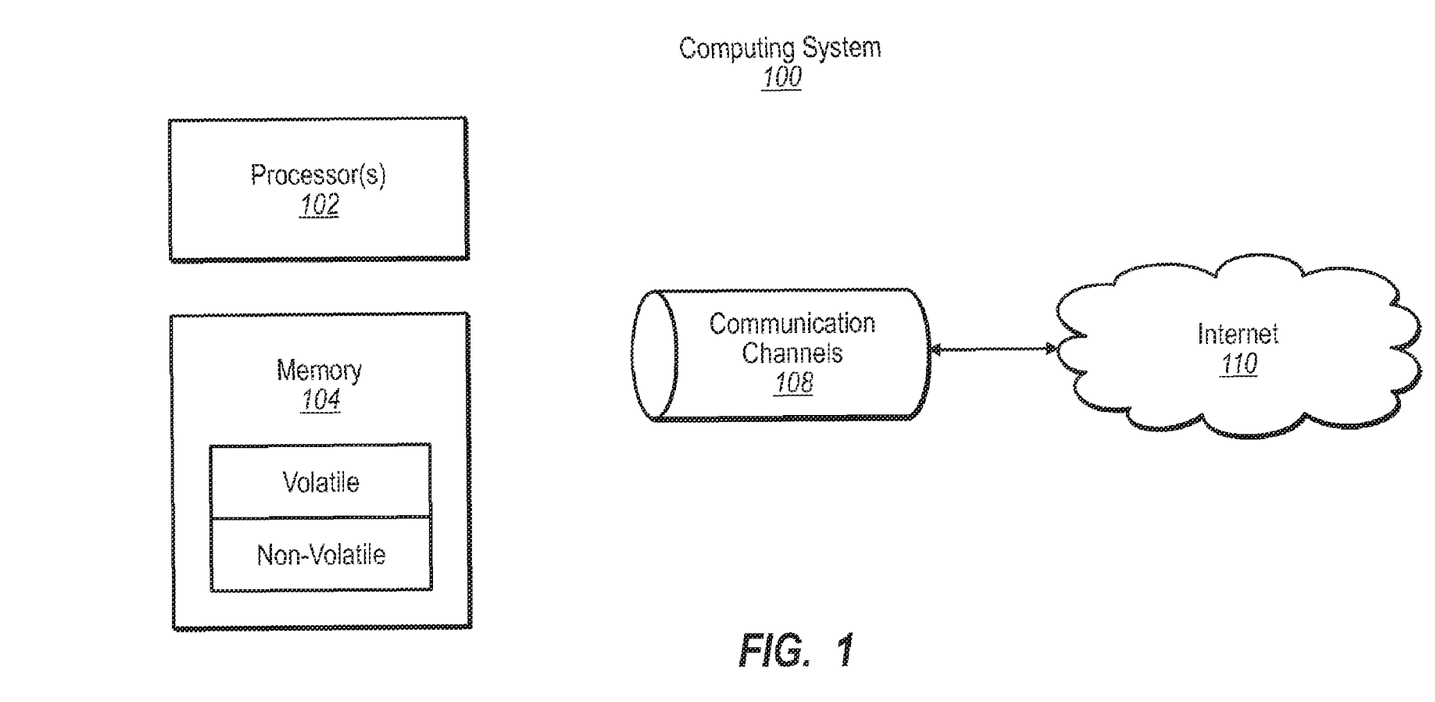
FIG. 1 illustrates an example computing system that may be used to employ embodiments described herein.

First, introductory discussion regarding computing systems is described with respect to FIG. 1. FIG. 1 illustrates a computing system, which may implement a message processor in software. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
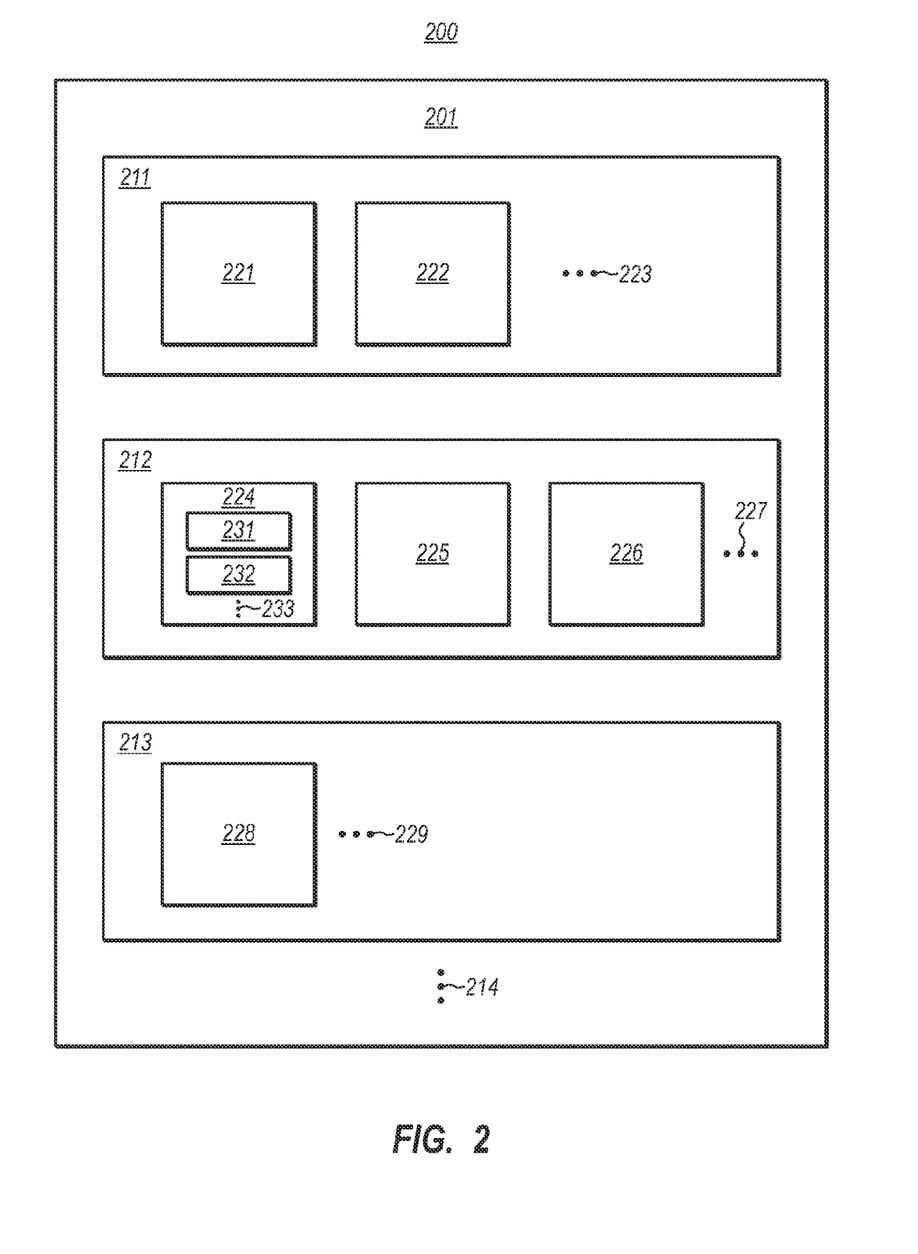
FIG. 2 illustrates a hierarchically-structured service definition.

FIG. 2 illustrates a hierarchically-structured service definition 200. The service definition includes a parent service definition 201 and a number of component definitions. The principles of the present invention are not limited to how the component definitions are included in the parent service component. In fact, the component definitions themselves might not be included in the service definition 201 at all. Instead, one, some, or even all of the component definitions may be located external to the service definition 201, but might be instead just referred to in the service definition. Nevertheless, in this description and in the claims, when a component definition is referred to as being included within a service definition, that means that either the component definition is entirely included within the service definition, partially included in the service definition, or perhaps is just referred to in the service definition.

In one embodiment, the component definitions are hierarchically structured. For instance, the component definitions themselves may be eXtensible Markup Language (XML) elements that may includes child elements, some of which perhaps also being component definitions. In addition, the component definitions may also be included within the larger service definition in a hierarchical fashion as well. For instance, the service definition may itself be an XML element, with each of the constituent component definitions (and/or a reference to the constituent component definitions) being descendent elements in the service XML element. An example of such a service document will be described following the description of FIG. 6.

An innumerable variety of services may be accomplished using this concept, since the services offered will depend on its components and how those components interact. Nevertheless, as an example, the parent service definition 201 is illustrated as including three first-tier component definitions 211, 212, 213. If the service definition 201 was an XML element, for example, the first-tier component definitions 211, 212 and 213 might be descendent XML elements of the service definition 201 XML element. The ellipses 214 represents that there may be more, or even less, than the three first-tier XML elements shown.

In the example that follows, the description of FIG. 6 (hereinafter referred to as the "non-limiting example"), the component definition 211 declaratively defines an implementation of the service, the component definition 212 declaratively defines one or more message interaction contracts, and the component definition 213 declaratively define one or more endpoints of the service. This is just an example, however. The position of the first tier component definitions 211 through 213 may help to define their relationship with the parent service definition 201.

In the specific example of FIG. 2, the first-tier component definition 211 includes second-tier component definitions 221 and 222, amongst potentially others as represented by the ellipses 223; the first-tier component definition 212 includes second-tier component definitions 224, 225 and 226, amongst potentially others as represented by the ellipses 227; and the first-tier component definition 213 includes second-tier component definition 228, amongst potentially others as represented by the ellipses 229. There may be even higher order component definitions. For instance, second-tier component definition 224 includes third-tier component definitions 231 and 232, amongst potentially others as represented by the ellipses 233.

Depending on the service to be implemented, there would be different component definitions, and/or different hierarchical structures of such components. In one embodiment, the position of the higher-order tier within the lower-order parent tier represents a particular relationship with the higher-order tier. For instance, the higher-order component may represent an input object, an output object, and input and output object, or a complex parameter for a parent component.

In one embodiment, one of the component definitions declaratively defines a workflow. Thus, a declarative workflow may be incorporated within a larger declarative service.

Figure 3:
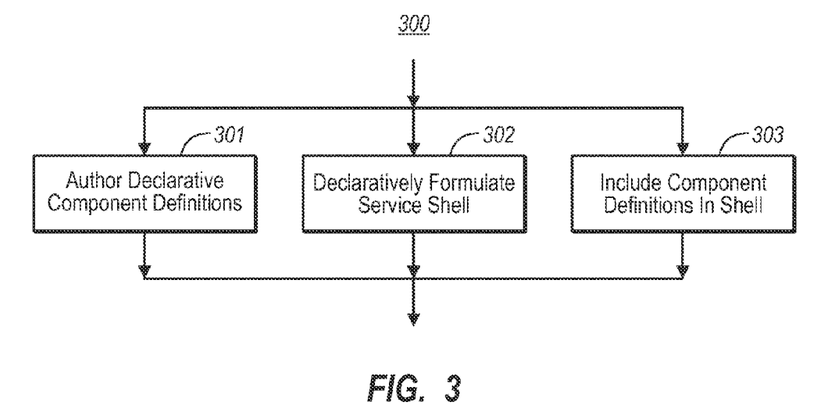
FIG. 3 illustrates a flowchart of a method for declaratively authoring a service definition.

FIG. 3 illustrates a flowchart of a method 300 for declaratively authoring a service definition. The method 300 illustrates three acts. However, the precise ordering of such acts in terms of time is not critical, and any two or more of such acts may be performed at the same time.

According to the method 300, a number of component definitions are authored (act 301). Each component definition defines a component of the service. A declarative service shell is also formulated (act 302). For instance, if the service definition was an XML document, the parent element might be a service definition shell. In addition, the component definitions are included within (either expressly and/or by reference), in a manner that the relation of each of the components corresponding to the component definitions to the service is defined (act 303).

Part of this method may be performed by a human being. In fact, each of the acts of the method 300 may be at least partly performed by a human being. Such a human being need not have knowledge of imperative coding semantics because the service may be entirely declaratively defined. In fact, at some point in the future, the service definition may be constructed with additional assistance from a computer which might receive even higher level directives from a human being or other entity to thereby construct a service definition. For instance, perhaps the higher level entity might simply specify a general structure of the service and the relation being corresponding components.

Figure 4:
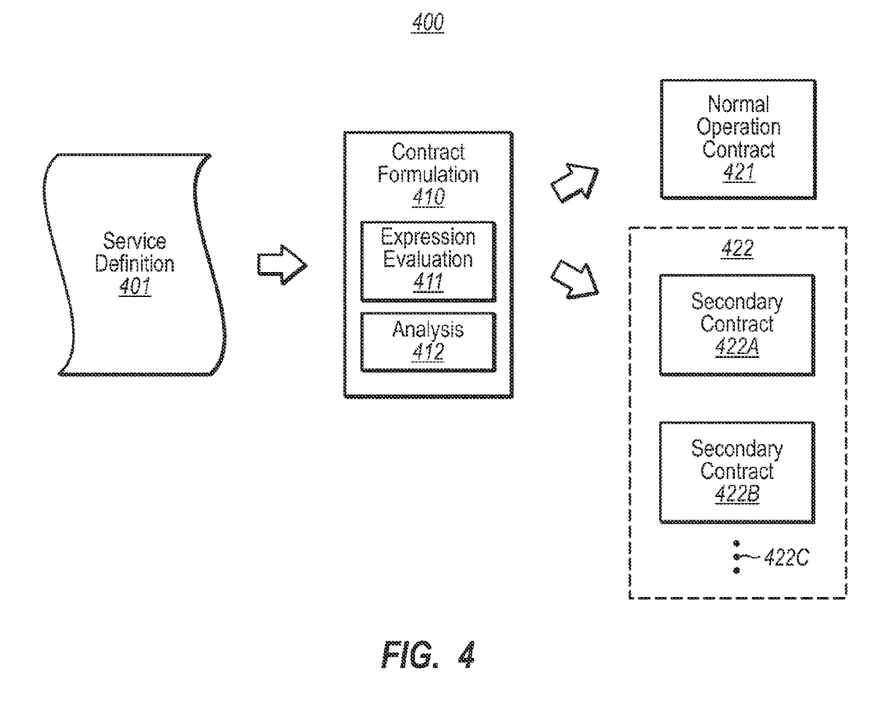
FIG. 4 illustrates an environment in which contracts are formulated using a declarative service or application definition.

FIG. 4 illustrates an environment 400 in which contracts are formulated using a declarative service or application definition. The environment 400 includes a declarative service definition 401 that is accessed by contract formulation component 410. The contract formulation component 410 includes an expression evaluation component 411 and an analysis component 412.

The expression evaluation component 411 parses through the declarative service definition, and formulates a normal operation contract 421 based on the declarations included in the service definition. An example of how this might be done is described above with respect to FIGS. 2 and 3.

An operation contract includes semantics for sending and receiving application messages during execution of the program. For instance, the operation contract defines the conditions on which application messages may be sent, which messages are correlated to which messages, any dependencies between application messages, the structure of various kinds of messages, and the like. A "normal operation" contract or "primary operation" contract defines the messages exchanges and structures that occur during normal execution of the program. The declarative service definition 401 includes declaration for all of the operations that occur during the normal course of execution of the program.

An analysis component 412 performs analysis on the declarative service definition to the point where it can infer and generate secondary contracts 422 that supplement the normal operation contract 421, even though the secondary contract is not directly defined in the service definition 401. In this case, the analysis component 412 formulates two secondary contracts 422A and 422B, although the ellipsis 422C represents that there may be more than two secondary contracts implied, or even just one secondary contract implied. The secondary contracts 422 define operations that do not occur in the normal execution of the application, or define operations that extend beyond the normal execution of the application. As an example, the secondary contract might be an error contract that defines operations that occur during error handling. As another alternative, the secondary contract might be a consistency contract that defines which operations occur under a transaction. Such secondary contracts are not defined in the declarative service definition. Nevertheless, the analysis component 412 infers these secondary contracts based on information extracted from the declarative service definition, and based on the normal operation contract 421.

Figure 5:
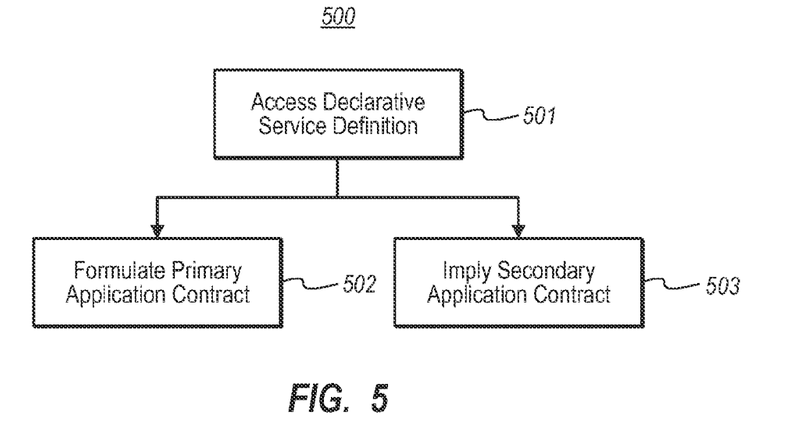
FIG. 5 illustrates a flowchart of a method for implying secondary contracts from a program definition.

FIG. 5 illustrates a flowchart of a method 500 for implying secondary contracts from a program definition. The method 500 might be performed entirely by a computing system such as, for example, by the computing system 100 of FIG. 1. The method 500 might be performed by a computing system that has access to a physical computer program product that comprises one or more physical computer-readable media having thereon computer-executable instructions that, when executed by one or more processors of the computing system, cause the computing system to perform the method.

The method 500 begins by accessing a declarative service definition (act 501). Service definition 200 (see FIG. 2) is an example of such a declarative service definition. Then, several things might happen. The primary operation contract might be formulated (act 502) using the declarative service definition. An example of the formulation of a normal operation contract based on a declarative service definition is described with respect to FIGS. 2 and 3, and the accompanying description. In general, the formulation of a primary operation contract based on a declarative service definition is known.

What is not known, however, is how to imply contracts from a declarative service definition, when the implied contract is not declaratively defined by the declarative service definition. Nonetheless, the method 500 includes analyzing the declarative service contract to imply a secondary application contract (act 503). This act might be performed multiple times if there are multiple secondary application contracts to imply.

Figure 6:
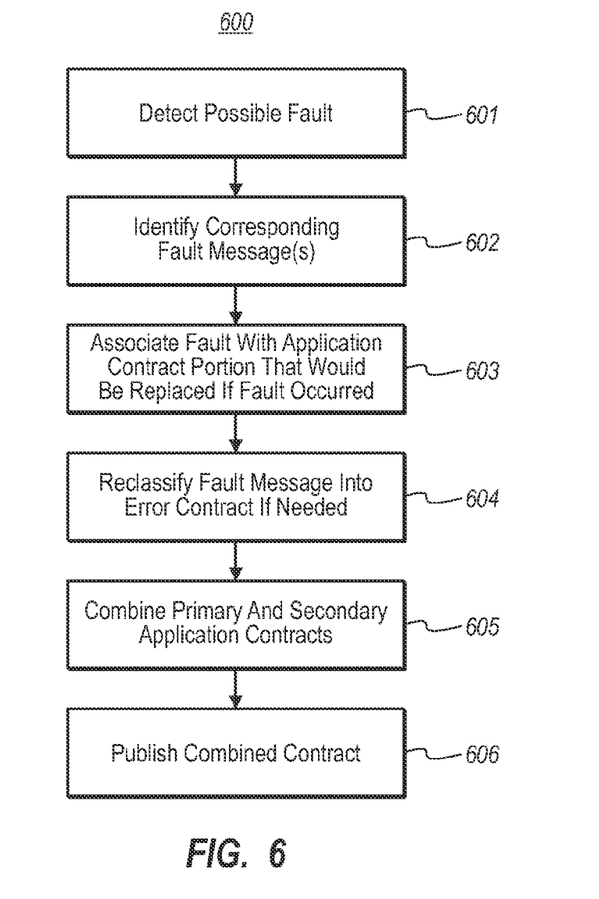
FIG. 6 illustrates a method for analyzing a declarative service definition to thereby imply an error contract, which is a type of secondary contract.

FIG. 6 illustrates a method 600 for analyzing a declarative service definition to thereby imply an error contract, which is a type of secondary contract. The method 600 may be performed for each of multiple possible faults associated with a program that is formulated from the declarative service definition.

Although the declarative service definition does not declaratively define the error contract, the declarative service definition is evaluated to detect one, some or all of the possible faults that might occur during execution of the operation. FIG. 6, and FIGS. 7A through 7E, and FIGS. 8A through 8C will be described with respect to a program that is kept intentionally simple. That is, the program does a simple division operation. Specifically, the service receives two messages, one containing the dividend, and one containing the divisor. The service then divides the dividend by the divisor and returns the quotient in our message, and the remainder in another message. Of course, this is just a simple example used for purposes of illustration only. There is no limit to the variety or complexity of the application that is described by the declarative program definition. The example will be referred to as the "division" example, and will be referred to often throughout the remainder of this description.

The method includes an act of detecting a possible fault that may occur during execution of an operation of the program (act 601). The method 600 may be performed for each detected possible fault. In the division example, the analyzer 412 of FIG. 4 might detect that a division operation is occurring. The analyzer 412 might have a pre-constructed list of possible faults associated with a variety of operations. In the division operation, for example, an error might occur if the divisor is zero. This fault need not be defined in the declarative program definition. Other examples of faults might be that one or more of the dividend is too large, the dividend is of the wrong type, the divisor is of the wrong type, and so forth.

One or more fault message corresponding to the possible fault are then identified (act 602). For instance, there might be a "Divide by zero" message that the analyzer associates with the identified divide by zero fault. An association is identified between the possible fault and a portion of the application contract that will be replaced by the fault if the operation fails (act 603). In the division example, should a divide by zero error occur, the Divide by Zero message will replaced the two outgoing messages that provide the quotient and the dividend, respectively. If the analysis reveals that an application message defined in the normal operation contract is really a fault message, then the fault message is removed (act 604). The primary (or "normal") and secondary operation contracts are then combined (act 605), and published as a combined contract (act 606).

The method 600 thus illustrates a mechanism for implying a secondary error contract and including that secondary error contract as part of the published combined contract. The method 600 may be altered somewhat in order to imply a secondary consistency contract. Specifically, possible faults will still be identified (act 601). However, the declarative service definition and the primary application contract will then be evaluated to identify one of more consistency guarantees required by the declarative service definition. The secondary error contract is then populated with these consistency guarantees, and combined with the primary application contract prior to publication.

As previously mentioned with respect to the analyzer 412, the analyzer 412 analyzes the declarative service contract to imply a secondary application contract. This may be accomplished in a number of ways, several examples of which are provided with respect to FIGS. 7A through 7E. However, it will be understood by those of ordinary skill in the art after having read this specification that the examples of FIGS. 7A through 7E are merely examples, and do not represent all possible ways to analyze a declarative service contract to imply a secondary operation contract. Each of the examples are with respect to the simple divide operation contract.

Figure 7A:
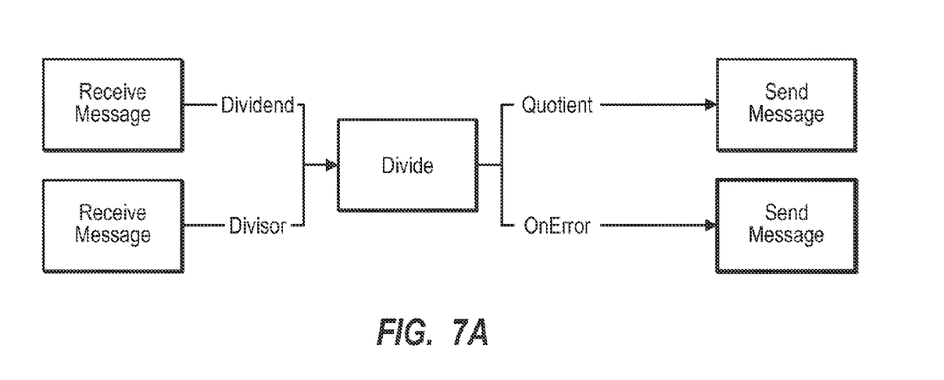
FIG. 7A illustrates a logical flow in which branches are defined by the author of the declarative service contract as either being success or failure paths.

FIG. 7A illustrates a logical flow in which branches are defined by the author of the declarative service contract as either being success or failure paths. For example, failure paths may be marked using an OnError indication. The execution of messaging activities along the marked path may then be inferred to deal with fault messages rather than application messages. In the division example, the analyzer understands that a division operation is to be provided upon receiving a dividend message, and a divisor message. A successful path results in the quotient being returned in a separate message. A failure path (marked by the developer as an "OnError" path) results in an error message being returned. In this example, it is implied to the analyzer that if an error occurs the message in the failure path is to replace the message in the success path.

Figure 7B:
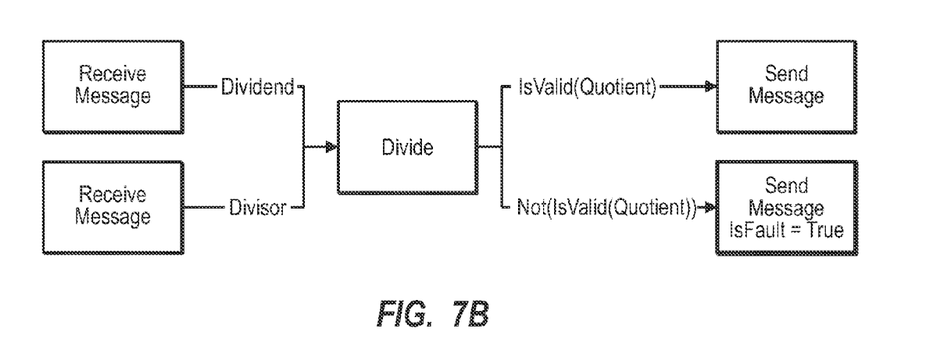
FIG. 7B illustrates a logical flow that occurs when the messaging activities are marked by the developer as being part of the fault contract.

FIG. 7B illustrates a logical flow that occurs when the messaging activities are marked by the developer as being part of the fault contract (marked as "Not(IsValid (Quotient))") or the normal application contract (marked as "IsValid(Quotient)"). Here, the analyzing the declarative service contract to imply a secondary application contract is performed with the assistance of activity labeling in the declarative service contract. For example, a messaging activity for a failure case may be marked using an IsFault indication. The execution of marked messaging activities may then be inferred to be deal with fault messages rather than application messages.

Figure 7C:
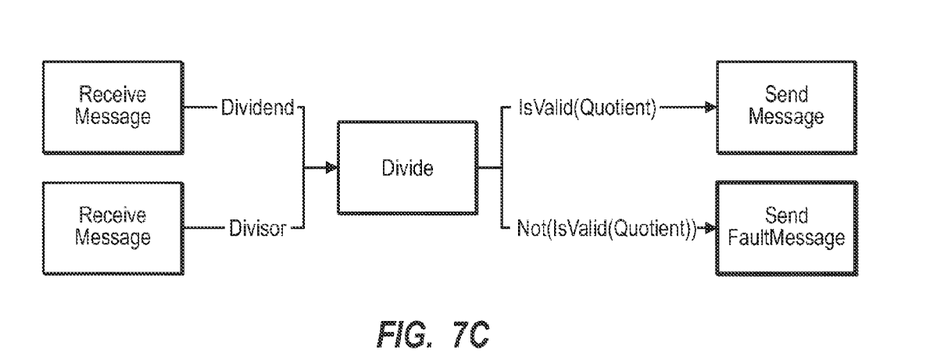
FIG. 7C illustrates a logical flow that occurs when message type analysis is used to imply a secondary contract.

FIG. 7C illustrates a logical flow that occurs when message type analysis is used to imply a secondary contract. With message type analysis, the format or contents of the message may be analyzed to distinguish application and fault messages. For example, fault messages may be represented by a FaultMessage contract or a "Fault" content in a contract. The execution of messaging activities may then be inferred to be dealing with fault messages rather than application messages based on examination of the message contract.

Figure 7D:
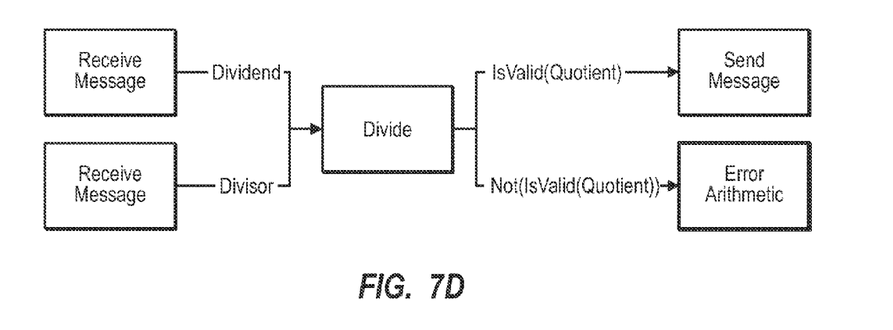
FIG. 7D illustrates a logical flow that occurs when activity type analysis is used to imply a secondary contract.

FIG. 7D illustrates a logical flow that occurs when activity type analysis is used to imply a secondary contract. With activity type analysis, the format or contents of the activity may be analyzed to distinguish application and fault messages. With activity type analysis, a set of non-messaging activities may be recognized as responsible for later transmission of a message. For example, an Error activity may raise an exceptional condition in the program. If the program contains no handler for that exceptional condition, then the program may be inferred to transmit a fault message whose content is based on the kind of exceptional condition.

Figure 7E:
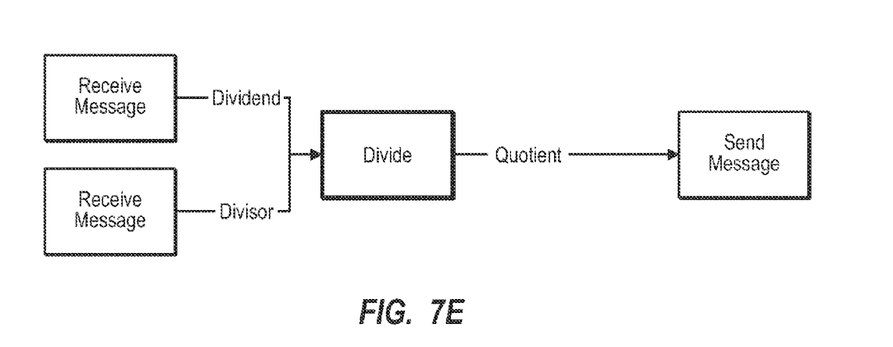
FIG. 7E illustrates a logical flow that occurs when semantic analysis is used to imply a secondary contract.

FIG. 7E illustrates a logical flow that occurs when semantic analysis is used to imply a secondary contract. In this case, the data and execution flow of the program may be recognized as having a potential exceptional condition responsible for later transmission of a message. For example, data flow analysis may reveal that the Divisor parameter comes from user input, that there is no program check that the Divisor parameter is non-zero, and that the Divide activity divides a number by the Divisor parameter. If the program contains no handler for that exceptional condition, then the program may be inferred to transmit a fault message when the Divisor parameter is zero.

As previously mentioned with respect to act 603 of FIG. 6, the fault message is associated with the normal application contract that would be replaced by the fault message if an actual fault were to occur. Implementations for associating faults and the normal operation contract will be described with respect to FIGS. 8A through 8C.

Figure 8A:
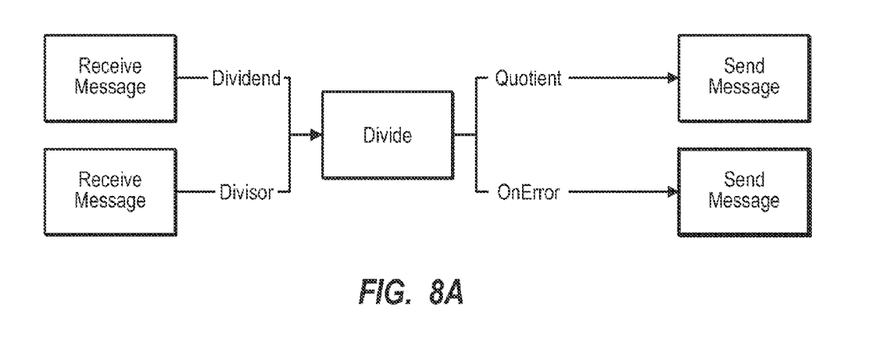
FIG. 8A illustrates logical flow in which the identification of such an association using branch labeling.

FIG. 8A illustrates logical flow in which the identification of such an association using branch labeling. With branch labeling, branches are marked by the developer as either being success or failure paths. For example, failure paths may be marked using an OnError indication (as was shown in FIG. 7A). The corresponding branches may then be taken in parallel with fault messages along the failure path associated with application messages along the success path. The fault messages may have been identified using any of the implementations described before, not necessarily limited to branch labeling.

Figure 8B:
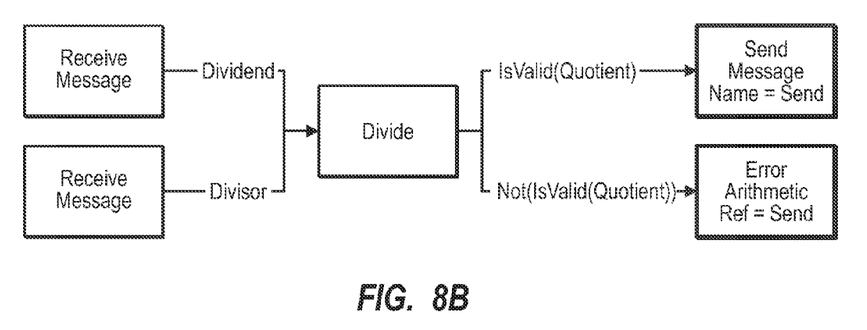
FIG. 8B illustrates a logical flow in which the identification of the association is performed using activity labeling.

FIG. 8B illustrates a logical flow in which the identification of the association is performed using activity labeling. With activity labeling, activities are marked with a reference property by the developer. For example, one activity may be named Send and another activity may refer to Send. The fault and application messages associated with the corresponding activities may then be inferred to be associated by reference. The fault messages may have been identified using any of the implementations described before, not necessarily limited to activity labeling.

Figure 8C:
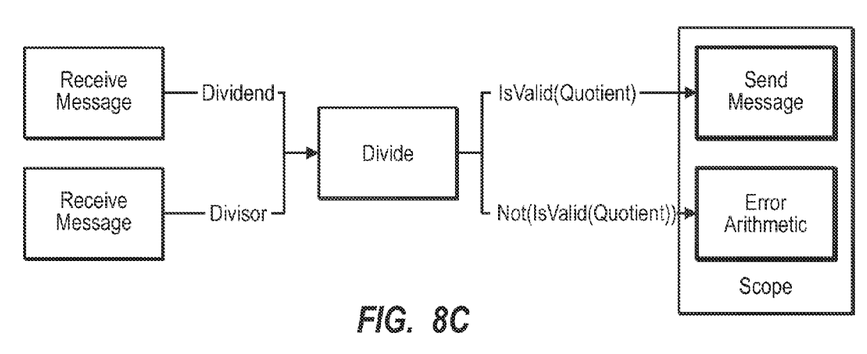
FIG. 8C illustrates a logical flow in which the identification of the association is performed using scoping.

FIG. 8C illustrates a logical flow in which the identification of the association is performed using scoping. With scoping, activities are grouped by the developer into topological relationships. For example, two activities may be related by drawing a scope box around the two. The fault and application messages associated with the related activities may then be inferred to be associated because of mutual membership in one or more scopes.

As previously mentioned, the declarative service contract may also be used to imply local behaviors. Local behaviors are execution flows that differ depending on where the execution is occurring. Examples of local behaviors include compression settings and encryption settings.

Figure 9:
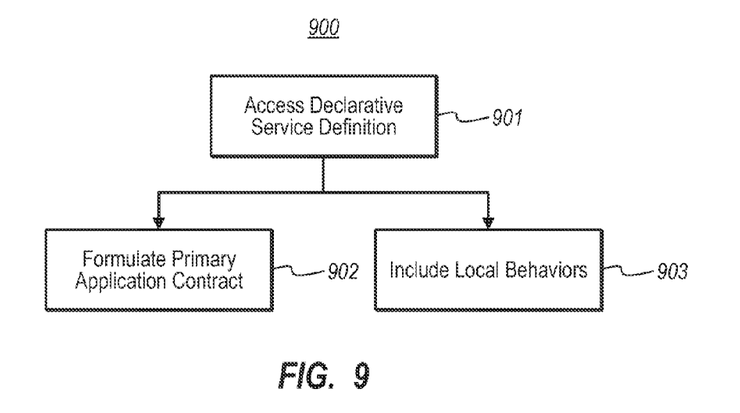
FIG. 9 illustrates a flowchart of a method for implying local behaviors from a declarative program definition.

FIG. 9 illustrates a flowchart of a method 900 for implying local behaviors from a declarative program definition. The declarative service definition that declaratively defines a program is accessed (act 901). Then, the application contract is formulated using the declarative service definition, the application contract including semantics for sending and receiving application messages during execution of operation by the program (act 902). An example of how this is performed is described above with respect to the XML example. The application contract further includes local behaviors that may differ depending on an environment in which the program is to execute (act 903).

The following is an example declarative service definition that defines a primary application contract, but from which a secondary error contract may be inferred, even though not directly included in the declarative service definition. Line numbering is added for purposes of subsequent discussion. The declarative service definition may be included hierarchically within a container object (not described), and potentially with endpoint definitions (now shown).

```
1.   <WorkflowService >
2.     <p:Sequence>
3.       <p:Sequence.Variables>
4.         <p:Variable x:TypeArguments="x:String" Name="RoutingCode" />
5.         <p:Variable x:TypeArguments="s2:OrderItem[ ]" Name="OrderItems" />
6.         <p:Variable x:TypeArguments="x:Double" Name="TotalCost" />
7.         <p:Variable x:TypeArguments="x:Boolean" Name="OutOfStock" />
8.       </p:Sequence.Variables>
9.       <Receive      x:Name="__ReferenceID0"        CanCreateInstance="True"
                       OperationName="PlaceOrder"
                       ServiceContractName="OrderService">
10.        <ReceiveParametersContent>
11.          <p:OutArgument            x:TypeArguments="x:String"
                     x:Key="RoutingCode">[RoutingCode]</p:OutArgument>
12.          <p:OutArgument            x:TypeArguments="s2:OrderItem[ ]"
                     x:Key="LineItems">[OrderItems]</p:OutArgument>
13.        </ReceiveParametersContent>
14.      </Receive>
15.      <p:ForEach x:TypeArguments="s2:OrderItem" Values="[OrderItems]">
16.        <p:ActivityAction x:TypeArguments="s2:OrderItem">
17.          <p:ActivityAction.Argument>
18.            <p:DelegateInArgument        x:TypeArguments="s2:OrderItem"
                     x:Name="__ReferenceID1" Name="lineItem" />
19.          </p:ActivityAction.Argument>
20.          <p:Sequence>
21.            <p:Assign x:TypeArguments="s2:OrderItem" To="[item]">
22.              <p:Assign.Value>
23.                <p:InArgument x:TypeArguments="s2:OrderItem">
24.                  <p:DelegateArgumentValue
                         x:TypeArguments="s2:OrderItem">
25.                    <x:Reference>__ReferenceID1</x:Reference>
26.                  </p:DelegateArgumentValue>
27.                </p:InArgument>
28.              </p:Assign.Value>
29.            </p:Assign>
30.            <p:If Condition="[item.Quantity < 50.0 ]">
31.              <p:If.Then>
32.                <p:Assign    x:TypeArguments="x:Double"     To="[TotalCost]"
                         Value="[totalCost + item.Quantity * 3.5 ]" />
33.              </p:If.Then>
34.              <p:If.Else>
35.                <p:Assign x:TypeArguments="x:Boolean" To="[OutOfStock]"
                         Value="True" />
36.              </p:If.Else>
```

-continued

```
37.              </p:If>
38.            </p:Sequence>
39.          </p:ActivityAction>
40.     </p:ForEach><p:If Condition="[outOfStock = False]">
41.       <p:If.Then>
42.         <SendReply Request="{x:Reference _ReferenceID0}">
43.           <SendMessageContent>
44.             <p:InArgument
                       x:TypeArguments="x:Double">[TotalCost]</p:InArgument>
45.           </SendMessageContent>
46.         /SendReply>
47.       </p:If.Then>
48.       <p:If.Else>
49.         <SendReply Request="{x:Reference _ReferenceID0}">
50.           <SendParametersContent>
51.             <p:InArgument
                       x:TypeArguments="FaultException(s2:OutOfStockFault)"
                       x:Key="fault">[    New     FaultException(of
                       OutOfStockFault)(New      OutOfStockFault( ),New
                       FaultReason("Out                         of
                       stock!"))]</p:InArgument>
52.           </SendParametersContent>
53.         </SendReply>
54.       </p:If.Else>
55.     </p:If
56.   </p:Sequence>
57. </WorkflowService >
```

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The declarative service definition describes an ordering service where clients may order items. The definition is a sequence spanning lines 2 through 56. Lines 3 through 8 define the sequence variables needed for the ordering service including a routing code, an array of items associated with the order, a total cost of the order, and a Boolean representing whether or not there is an out of stock condition.

Lines 10-13 represent part of the normal application contract that is defined expressly. Here, as part of the normal application contract, the service will receive a routing code parameter, and a list of line items being ordered. Lines 43-45 also represent a portion of the normal application contract. Here, a total cost is returned to the client after appropriate calculation using the internal logic of the service. Thus, all of the normal interaction with the client is expressly defined in the declarative service definition. Lines 15-39 represent the internal logic of the service, and not the application contract itself. The logic will result in the total cost of the order, if there were none of the items that were out of stock, or an out-of-stock error, if there was at least one of the line items that was out of stock. The normal application contract represented from lines 42 to 45 represents the contract that occurs under normal operation, when all of the ordered items are in stock. Lines 49 to 53 represents that parameters are to be sent if there is an out-of-stock error condition.

Here, the identification of the association between the error condition, and the normal application message is performed using scoping, semantic analysis, and activity labeling.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. One or more storage device having thereon stored computer-executable instructions that are structured such that, when executed by a processor of a computing system, causes the computing system to perform a method for implying secondary contracts from a declarative program definition, the method comprising:

an act of accessing an XML declarative service definition that declaratively defines a program;

an act of formulating a primary application contract using the declarative service definition, the primary application contract including semantics for sending and receiving application messages during execution of operations by the program, the primary application contract being directly described in the declarative program definition; and an act of analyzing the declarative service definition and the primary application contract to generate a secondary application contract that includes semantics for sending and receiving application messages during error handling for the program, the declarative service definition failing to directly describe the secondary application contract, wherein the generation of the secondary application contract comprises the following:

an act of detecting one or more possible faults that may occur during execution of an operation of the program;

for at least one of the one or more detected possible faults, an act of identifying one or more associated fault messages corresponding to the corresponding detected possible fault, an act of identifying an association between the corresponding possible fault and a portion of the primary application contract that will be replaced if the operation fails, and an act of populating the secondary application contract with at least a portion of the identified one or more associated fault messages corresponding to the corresponding identified possible fault which is combined with at least a portion of the semantics of the primary application contract.

2. The one or more storage device of claim 1, wherein the act of identifying an association is performed using branch or activity labeling.

3. The one or more storage device of claim 1, wherein the act of identifying an association is performed using scoping.

4. The one or more storage device of claim 1, wherein the act of analyzing results in a determination that an application message that appears in the primary application contract is a fault message.

5. The one or more storage device of claim 4, wherein the fault message is removed from the primary application contract and inserted into the secondary application contract which is an error contract.

6. The one or more storage device of claim 1, wherein the act of analyzing the declarative service contract to generate a secondary application contract is performed with the assistance of branch or activity labeling in the declarative service definition.

7. The one or more storage device of claim 1, wherein the act of analyzing the declarative service contract to generate a secondary application contract is performed using message or activity type analysis.

8. The one or more storage device of claim 1, wherein the act of analyzing the declarative service contract to generate a secondary application contract is performed using semantic analysis.

9. The one or more storage device of claim 1, wherein either or both of the primary application contract and secondary application contract further includes at least one local behavior such that the local behavior may differ depending on an environment in which the program is to execute.

10. One or more storage device having thereon stored computer-executable instructions that are structured such that, when executed by a processor of a computing system, causes the computing system to perform a method for implying secondary contracts from a declarative program definition, the method comprising:

an act of accessing an XML declarative service definition that declaratively defines a program;

an act of formulating a primary application contract using the declarative service definition, the primary application contract including semantics for sending and receiving application messages during execution of operations by the program, the primary application contract being directly described in the declarative program definition;

an act of analyzing the declarative service definition and the primary application contract to generate a secondary application contract that includes semantics for processing application messages using particular guarantees for processing consistency, the declarative service definition failing to directly describe the secondary application contract, wherein the generation of the secondary application contract comprises the following:

an act of detecting one or more possible faults that may occur during execution of an operation of the program;

an act of identifying one or more consistency guarantees required by the declarative service definition corresponding to one or more of the one or more possible faults;

an act of populating the secondary application contract with at least a portion of the identified consistency guarantees; and an act of combining the primary and secondary application contracts.

11. The one or more storage device of claim 10, wherein the act of identifying a consistency guarantee is performed using branch or activity labeling.

12. The one or more storage device of claim 10, wherein the act of identifying a consistency guarantee is performed using scoping.

13. The one or more storage device of claim 10, wherein the act of analyzing results in a determination that an application message that appears in the application contract should use one of: at-least once messaging, at-most once messaging, or exactly once messaging.

14. The one or more storage device of claim 13, wherein the use of exactly once messaging includes semantics for performing operations associated with the program under a transaction.

15. The one or more storage device of claim 10, wherein the act of analyzing the declarative service contract to imply a secondary application contract is performed with the assistance of branch or activity labeling in the declarative service contract.

16. The one or more storage device of claim 10, wherein the act of analyzing the declarative service contract to generate a secondary application contract is performed using message or activity type analysis.

17. The one or more storage device of claim 10, wherein the act of analyzing the declarative service contract to generate a secondary application contract is performed using semantic analysis.

18. The one or more storage device of claim 10, wherein the either or both of the primary application contract and the secondary application contract further includes at least one local behavior such that the local behavior may differ depending on an environment in which the program is to execute.

19. One or more storage device comprising one of more physical computer-readable media having thereon stored computer-executable instructions that are structured such that, when executed by a processor of a computing system, causes the computing system to perform a method for implying secondary contracts from a declarative program definition, the method comprising:

an act of accessing an XML declarative service definition that declaratively defines a program;

an act of formulating a primary application contract using the declarative service definition, the primary application contract including semantics for sending and receiving application messages during execution of operations by the program, the primary application contract being directly described in the declarative program definition;

an act of analyzing the declarative service definition and primary application contract to generate a first secondary application contract that includes semantics for sending and receiving application messages during error handling for the program, the declarative service definition failing to directly describe the first secondary application contract, wherein the generation of the first secondary application contract comprises the following:

an act of detecting one or more possible faults that may occur during execution of an operation of the program;

an act of identifying one or more associated fault messages corresponding to one or more of the one or more possible faults;

an act of identifying an association between the possible fault and a portion of the application contract that will be replaced by the fault if the operation fails; and an act of populating the first secondary application contract with at least a portion of the identified associated fault messages; and an act of analyzing the declarative service definition and primary application contract to infer a second secondary application contract that includes semantics for processing application messages using particular guarantees for processing consistency, the declarative service definition failing to directly describe the second secondary application contract, wherein the generation of the second secondary application contract comprises the following;

an act of identifying one or more consistency guarantees required by the declarative service definition corresponding to one or more of the one or more possible faults; and an act of populating the second secondary application contract with at least a portion of the identified consistency guarantees; and an act of combining the primary and secondary application contracts.

20. The one or more storage device of claim 19, wherein the at least one of the primary application contract, the first secondary application contract, and the second secondary application contract further includes at least one local behavior such that the local behavior may differ depending on an environment in which the program is to execute.

21. One or more storage device having thereon stored computer-executable instructions that are structured such that, when executed by a processor of a computing system, causes the computing system to perform a method for implying secondary contracts from a declarative program definition, the method comprising:

an act of accessing a declarative service definition that declaratively defines a program;

an act of formulating a primary application contract using the declarative service definition, the primary application contract including semantics for sending and receiving application messages during execution of operations by the program; and an act of analyzing the declarative service definition and the primary application contract to generate a secondary application contract that includes semantics for sending and receiving application messages during error handling for the program, wherein the generation of the secondary application contract comprises the following:

an act of detecting one or more possible faults that may occur during execution of an operation of the program; and for at least one of the one or more detected possible faults, an act of identifying one or more associated fault messages corresponding to the corresponding detected possible fault, an act of identifying an association between the corresponding possible fault and a portion of the primary application contract that will be replaced if the operation fails, and an act of populating the secondary application contract with at least a portion of the identified one or more associated fault messages corresponding to the corresponding identified possible fault, wherein either or both of the primary application contract and secondary application contract further includes at least one local behavior such that the local behavior may differ depending on an environment in which the program is to execute.

22. One or more storage device having thereon stored computer-executable instructions that are structured such that, when executed by a processor of a computing system, causes the computing system to perform a method for implying secondary contracts from a declarative program definition, the method comprising:

an act of accessing a declarative service definition that declaratively defines a program;

an act of formulating a primary application contract using the declarative service definition, the primary application contract including semantics for sending and receiving application messages during execution of operations by the program;

an act of analyzing the declarative service definition and the primary application contract to generate a secondary application contract that includes semantics for processing application messages using particular guarantees for processing consistency, wherein the generation of the secondary application contract comprises the following:

an act of detecting one or more possible faults that may occur during execution of an operation of the program;

an act of identifying one or more consistency guarantees required by the declarative service definition corresponding to one or more of the one or more possible faults; and an act of populating the secondary application contract with at least a portion of the identified consistency guarantees, wherein the either or both of the primary application contract and the secondary application contract further includes at least one local behavior such that the local behavior may differ depending on an environment in which the program is to execute.

23. One or more storage device comprising one of more physical computer-readable media having thereon stored computer-executable instructions that are structured such that, when executed by a processor of a computing system, causes the computing system to perform a method for implying secondary contracts from a declarative program definition, the method comprising:

an act of accessing a declarative service definition that declaratively defines a program;

an act of formulating a primary application contract using the declarative service definition, the primary application contract including semantics for sending and receiving application messages during execution of operations by the program;

an act of analyzing the declarative service definition and primary application contract to generate a first secondary application contract that includes semantics for sending and receiving application messages during error handling for the program, wherein the generation of the first secondary application contract comprises the following:

an act of detecting one or more possible faults that may occur during execution of an operation of the program;

an act of identifying one or more associated fault messages corresponding to one or more of the one or more possible faults;

an act of identifying an association between the possible fault and a portion of the application contract that will be replaced by the fault if the operation fails; and an act of populating the first secondary application contract with at least a portion of the identified associated fault messages; and an act of analyzing the declarative service definition and primary application contract to infer a second secondary application contract that includes semantics for processing application messages using particular guarantees for processing consistency, wherein the generation of the second secondary application contract comprises the following;

an act of identifying one or more consistency guarantees required by the declarative service definition corresponding to one or more of the one or more possible faults; and an act of populating the second secondary application contract with at least a portion of the identified consistency guarantees, wherein the at least one of the primary application contract, the first secondary application contract, and the second secondary application contract further includes at least one local behavior such that the local behavior may differ depending on an environment in which the program is to execute.

* * * * *